May 31, 1932. F. W. HAEGER 1,861,055
HORIZONTAL DRILLING MACHINE
Filed May 19, 1930. 9 Sheets-Sheet 1

Inventor
Frank W. Haeger
By Blackmore, Spencer & Hitch
Attorneys

May 31, 1932. F. W. HAEGER 1,861,055
HORIZONTAL DRILLING MACHINE
Filed May 19, 1930 9 Sheets-Sheet 2

Inventor
Frank W. Haeger
By Blackmore, Spencer & Flick
Attorneys

May 31, 1932. F. W. HAEGER 1,861,055
HORIZONTAL DRILLING MACHINE
Filed May 19, 1930 9 Sheets-Sheet 3

May 31, 1932.  F. W. HAEGER  1,861,055
HORIZONTAL DRILLING MACHINE
Filed May 19, 1930    9 Sheets-Sheet 4

Inventor
Frank W. Haeger
By
Blackmore, Spencer & Hulse
Attorneys

May 31, 1932.  F. W. HAEGER  1,861,055

HORIZONTAL DRILLING MACHINE

Filed May 19, 1930  9 Sheets-Sheet 5

Inventor
Frank W. Haeger

By Blackmore, Spencer & Finch
Attorneys

May 31, 1932. F. W. HAEGER 1,861,055
HORIZONTAL DRILLING MACHINE
Filed May 19, 1930 9 Sheets-Sheet 6

Inventor
Frank W. Haeger
By Blackmore, Spencer & Hinh
Attorneys

May 31, 1932.  F. W. HAEGER  1,861,055
HORIZONTAL DRILLING MACHINE
Filed May 19, 1930   9 Sheets-Sheet 7

Inventor
Frank W. Haeger

By Blackmore, Spencer & Hirth
Attorneys

May 31, 1932. F. W. HAEGER 1,861,055
HORIZONTAL DRILLING MACHINE
Filed May 19, 1930 9 Sheets-Sheet 9

Inventor
Frank W. Haeger
by Blackmore, Spencer & Flint
Attorneys

Patented May 31, 1932

1,861,055

UNITED STATES PATENT OFFICE

FRANK W. HAEGER, OF SAGINAW, MICHIGAN, ASSIGNOR TO GENERAL MOTORS CORPORATION, OF DETROIT, MICHIGAN, A CORPORATION OF DELAWARE

HORIZONTAL DRILLING MACHINE

Application filed May 19, 1930. Serial No. 453,513.

This invention relates to drilling machines and has particular reference to a horizontal drilling machine for drilling and forming the ends of crankshafts.

In prior drilling machines for operating on crankshafts, the shaft has been stood on its end and a single operation performed thereon by the machine. The shaft has then been taken to a second machine where a second operation was performed and this was continued until all the operations were performed on one end of the shaft. The shaft was then inverted and the second series of operations performed to finish the second end.

In the present invention, a series of tools is provided whereby the various operations are performed in one machine at one time. The machine may be equipped to perform any number of operations although five or six are found to be ample.

The object of the invention is accomplished by mounting on the bed of the drilling machine a pair of reciprocable gear housings which contain suitable gearing for operating the various tools. The tools project from the gear housings toward each other and through openings in a slidable master drill plate to operate on the crankshaft ends, one of which ends has the usual circular flange. The shafts are mounted on a rotatable crankshaft holder or spool positioned between the drill plates and gear housings. The spool is indexed to rotate a given portion of a revolution to bring the crankshaft ends into successive positions whereby they may be operated on by the different tools of the gear housings. The tools in one gear housing may for instance (1) drill the pilot hole (2) drill the flange holes (3) cut relief in the face of the flange (4) ream the pilot hole (5) ream the flange holes. At the opposite end of the crankshaft, the tools may perform operations such as (1) drill the starting nut hole (2) chamfer the hole (3) tap the hole.

The gear housings are operated by the well-known oil gear method, the details of which form no part of the invention. The oil gearing is arranged so that the gear housings and master drill plate are moved away from the work when the tools have performed their operation. The index mechanism then rotates the spool a distance sufficient to bring it in position for the next operation and the gear heads again moved toward the work. Means is provided for causing the two gear heads to move toward and away from the work at the same speed.

Figure 3:
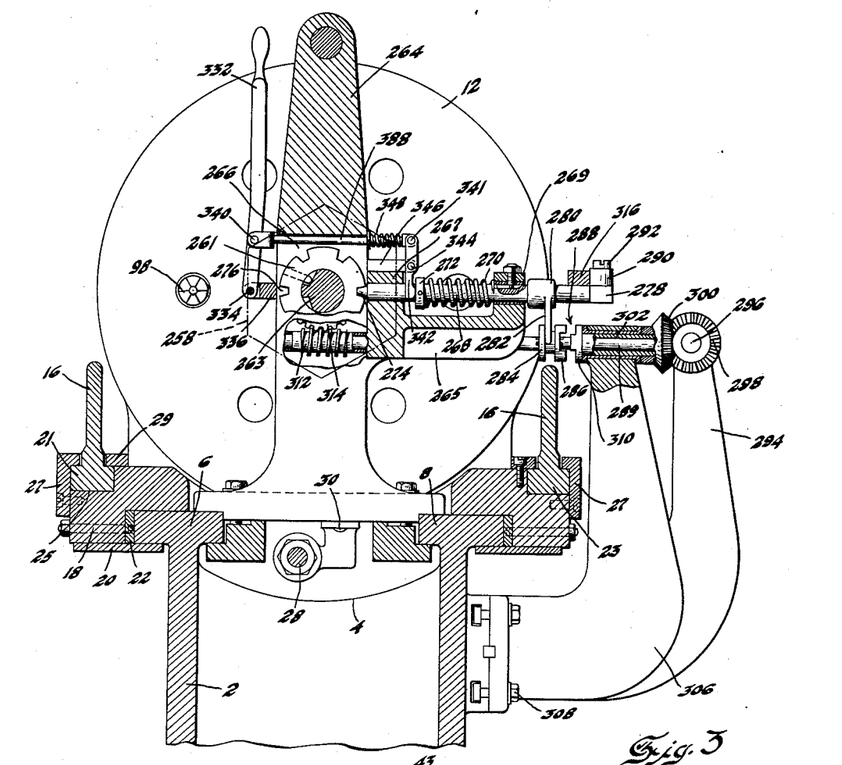
Figure 3 is a section taken substantially on the line 3—3 of Figure 1, showing the indexing mechanism.
Figures 8, 9, 28:
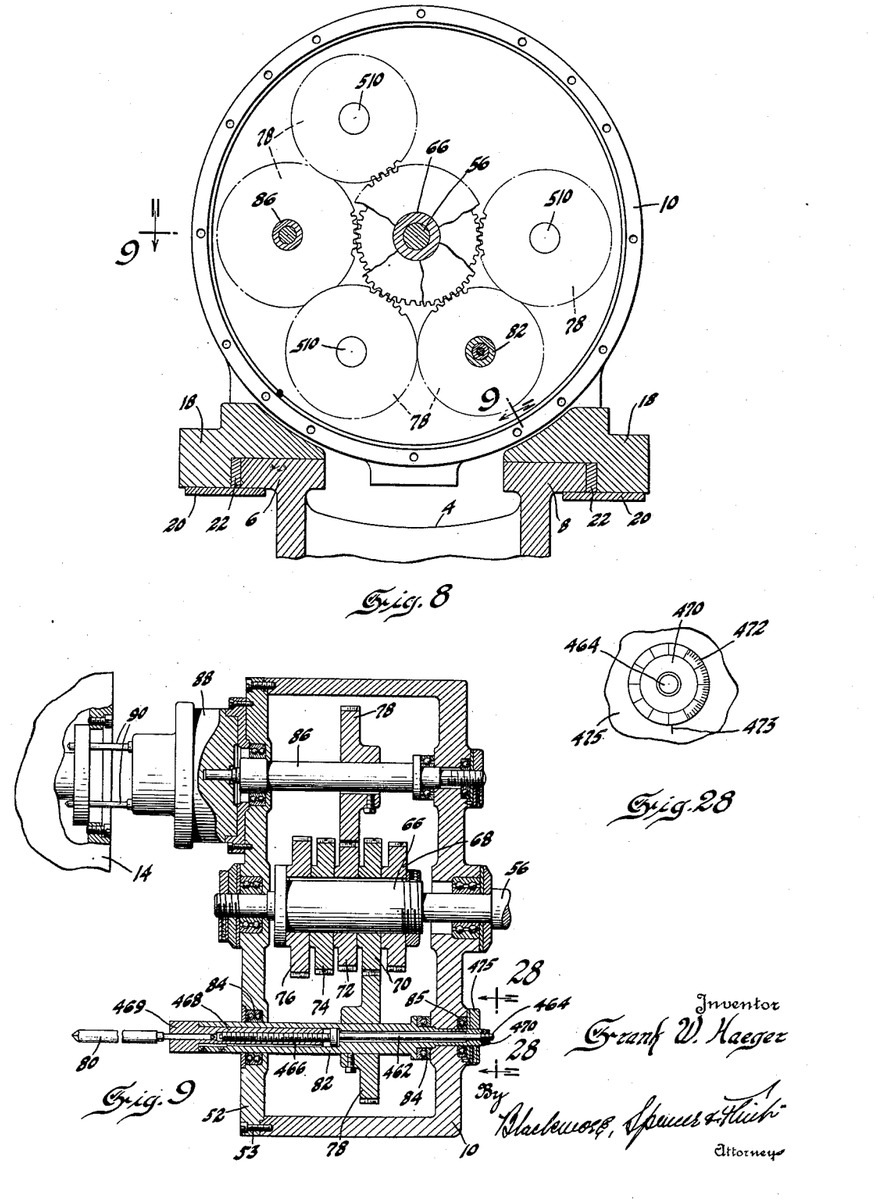
Figure 8 is a sectional view looking into one of the gear housings.
Figure 9 is a sectional view through one of the gear housings or heads showing two of the tools.
Figure 28 (Sheet 4) is a detailed view on the line 28—28 of Figure 9.
Figure 14:
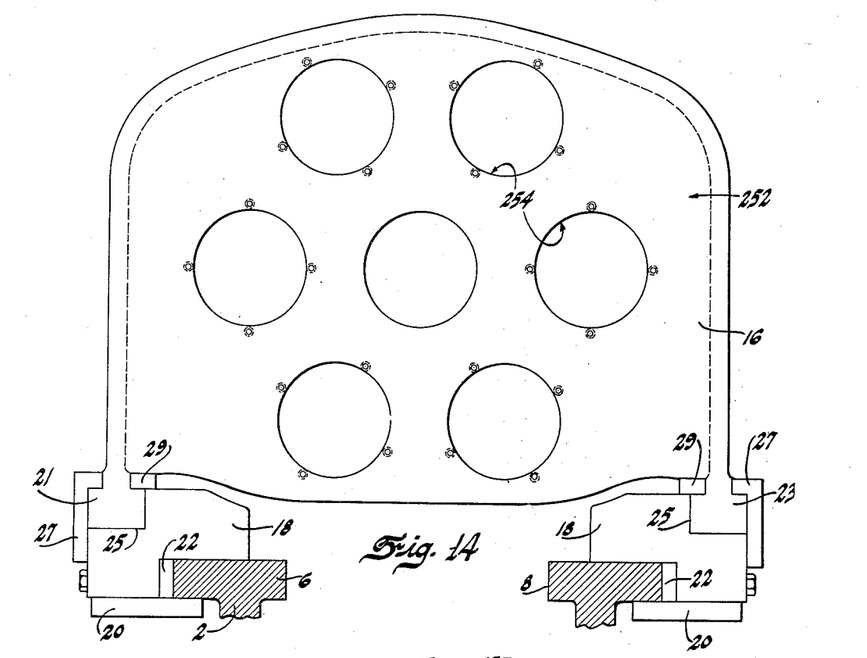
Figure 14 is a detailed face view of one of the master drill plates and its connection to the gear housing.
Figure 15:
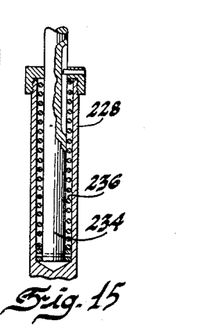
Figure 15 is a partial section on the line 15—15 of Figure 13

Referring to the drawings, the numeral 2 indicates the bed of the machine. The bed is dished at its mid portion as shown at 4 in Figures 3 and 4, and is provided with T-heads 6 and 8 at its sides. On the T-heads are slidably mounted the gear housings or heads 10 and 12 in which are slidably mounted the master drill plates 14 and 16. The manner in which the housings and plates are mounted is best shown in Figures 3, 8 and 14. The lower side portions of the housing are laterally shaped as indicated at 18 and plates 20 are secured to the portion 18 so as to overlap the T-heads 6 and 8. Shims or filler pieces 22, secured to the heads, may be used. The master plates 14 and 16 have the feet 21 and 23 which slide in the recessed portions 25 in the parts 18. The feet are held in the recesses 25 by means of the gibs 27 and 29.

Figure 1:
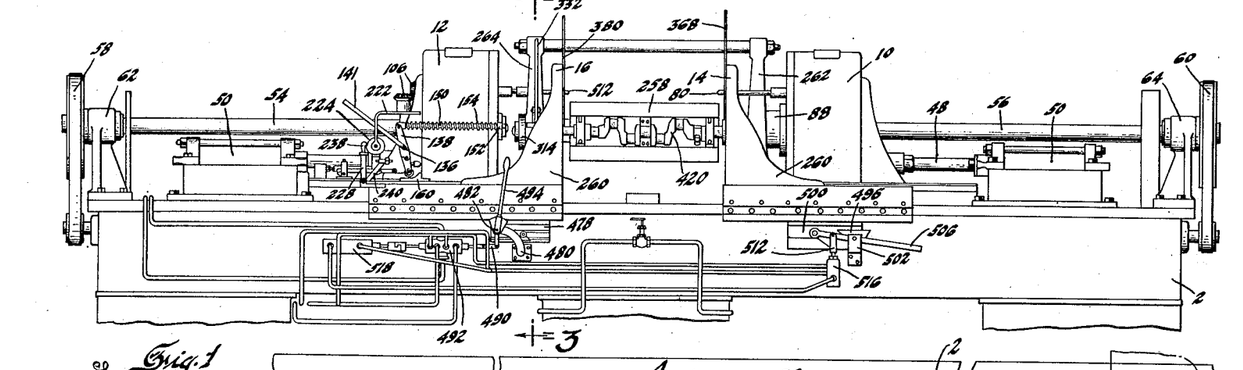
Figure 1 is a side elevation of the drilling machine.
Figure 2:
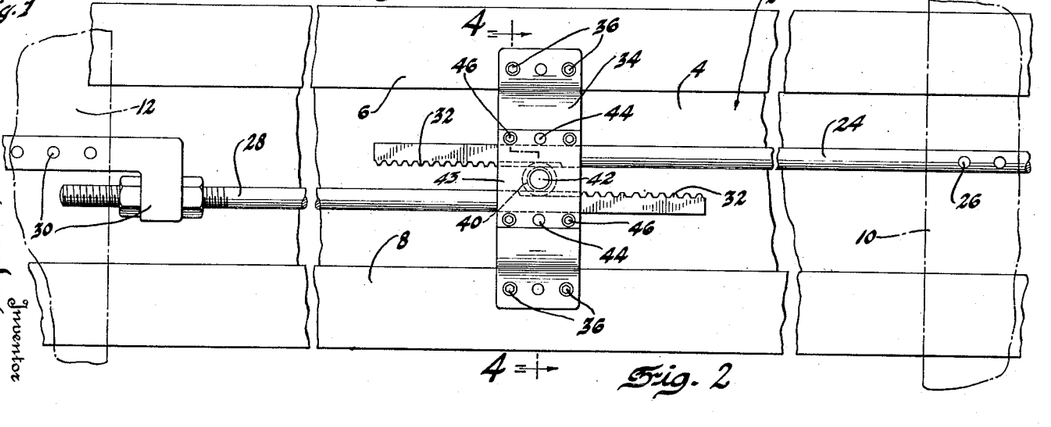
Figure 2 is a plan view of a portion of the bed showing the equalizing means for causing the two gear heads to reciprocate at the same speed.
Figure 4:
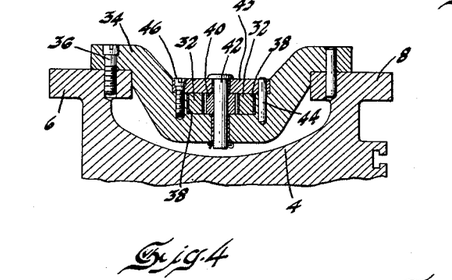
Figure 4 is a section on the line 4—4 of Figure 2.

The two gear housings or heads 10 and 12 are interconnected at the bed of the machine as shown in Figures 2 and 4. The head 10 has the bar or rod 24 rigidly secured thereto at 26 while the head 12 has the bar or rod 28 rigidly and adjustably secured thereto as at 30. The bars extend toward each other and overlap and are formed into rack shape 32 at their overlapping portions. The bars pass through a saddle 34 secured substantially centrally of the bed 2 to the top of the T-heads 6 and 8 by means of the bolts 36. The mid portion of the saddle is suitably shaped to snugly receive the racks 32, the shims or filler pieces 38 being provided to assure an accurate fit. Between the two racks 32 a gear 40 is journalled on a pin 42 mounted in the base of the saddle 34 and in a plate 43 rigidly secured to the saddle 34 by means of the dowel pins 44 and the machine screws 46. The gear housings 10 and 12 are operated by the plungers 48 operating in the cylinders 50, Figure 1. As the oil is forced into the cylinders 50 to push the plunger either toward or away from the work, the mechanism of Figures 2 and 4 will insure a simultaneous uniform movement of the two housings so that uniformity of the operation on the work or on the crankshafts is assured.

Figure 10:
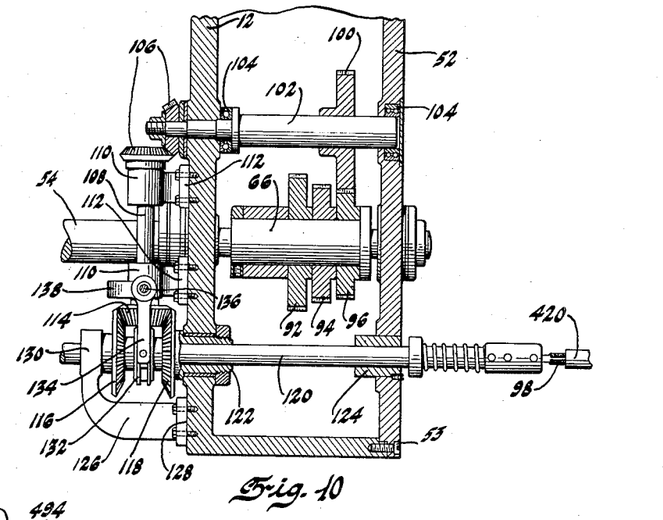
Figure 10 is a sectional view through one of the gear housings showing the tap and the means for driving and reversing the same.

The gear heads or housings are shown in detail in Figures 8, 9 and 10. Referring to Figures 8 and 9, it will be seen that the housing 10 has the closure or cover member 52 secured thereto by means of the machine screws 53. Mounted centrally in bearings in the housings 10 and 12 are the ends of shafts 54 and 56 driven as at 58 and 60 (Figure 1) from the ends of the machine, preferably by individual electric motors. These shafts 54 and 56 are suitably mounted in bearings 62 and 64 at the ends of the machine. Inside the housings each shaft 54 and 56 has rigidly mounted thereon a sleeve or collar 66. On the sleeve 66 of the shaft 56 there are rigidly mounted the gears 68, 70, 72, 74 and 76, each of which is adapted to mesh with a mating gear 78 as shown in Figure 9 to drive an individual tool. As best shown in Figure 9, gear 70 is shown as driving a gear 78 to operate the reamer 80. The reaming tool 80 is suitably connected to a shaft 82 mounted in bearings 84 and 85 in the housing. The gear 72 is also shown as meshing with the gear 78 to operate the shaft 86 which in turn operates the head 88 having the drills 90 which drill the flange holes. In a similar way, the gears 68, 74 and 76 are connected to tools to drill the pilot hole, to cut relief in the face flange, and to ream the flange holes.

In Figure 10, the shaft 54 is mounted in the housing 12 in a manner similar to the shaft 56 in the housing 10 and on the sleeve 66 are mounted the gears 92, 94 and 96 which are interconnected to the tools which drill the starting nut hole, chamfer the hole, and tap the hole. The drive for the drill and chamfer tools from the gears 92 and 94 is the same as the drive for the tools shown in Figure 9, but the drive for the tapping tool 98 is different for the reason that the tool must be turned out of the threaded tap hole, whereas the other tools are merely pulled out.

The drive for the tapping tool 98 is taken from the gear 96 by a gear 100 rigidly mounted on the shaft 102 mounted in bearings 104 in the housing 12. Intermeshing bevel gears 106 transmit the drive from the shaft 102 exteriorly of the housing to the shaft 108 mounted in brackets 110 secured as at 112 to the side of the housing 12. The shaft 108 has the bevel gear 114 secured to its lower end which gear meshes with the bevel gears 116 and 118 freely mounted on a shaft 120 slidably mounted in bearings 122 and 124 in the housing 12. A bracket 126 is secured to the housing as at 128 and extends away therefrom and has an opening at its end 130 to slidably receive the shaft 120 and to hold the gear 116 in mesh with the gear 114. The gear 118 is held in mesh with the gear 114 by the end of the bearing 122. A clutch member 132 is splined to the shaft 120 and is positioned between and adapted to engage either of the gears 116 and 118. The clutch is operated by the fork 134 rigidly mounted on the rod 136 journalled in the bracket 110. The fork 134 has the connecting arm 138 to unite its two tines. The rod 136 extends forwardly through a bracket or extension 139 (Figures 13, 15, 16, 17) rigid with the head 12 and projects from the front of the machine and has its end formed into a handle 141 (see Figure 1). The handle is for the purpose of manually operating the clutch 132.

The means for starting the tap into the crankshaft end and reversing the drive to withdraw or turn out the tap from its threads will now be described.

Referring now to Figures 1, 13, 16, 17 and 18, the rod 136 has rigidly mounted thereon, at its outer extremity, an arm 138. The lower portion 140 of the arm 138 is hinged as at 142 and is capable of pivoting in but one direction owing to the flat engaging surface at 144. The lower end of the arm 140 is forked and has pivoted therein the roller 146. The upper end of the arm 138 is pivoted as at 148 to a rod 150 which is slidably mounted in a bracket 152 secured on the gear housing 12. A coil spring 153 surrounds the rod 150 and is confined between the arm 138 and bracket 152 and always urges the arm 138 to the left when referring to Figures 1 and 13. A weight 154 is secured to the hinged portion 140, the purpose of which is to hold the hinged end 140 substantially in the position shown in Figure 13. A leaf spring 156 is secured at 158 to the arm 138 and presses with its free end against the hinged end 140 to urge it to swing on its pivot 142 against the action of the weight 154. The spring 156 is so tensioned that it will cease to function after it has slightly moved the end 140 against the effort of the weight 154. The purpose of this will later be explained.

Figure 13:
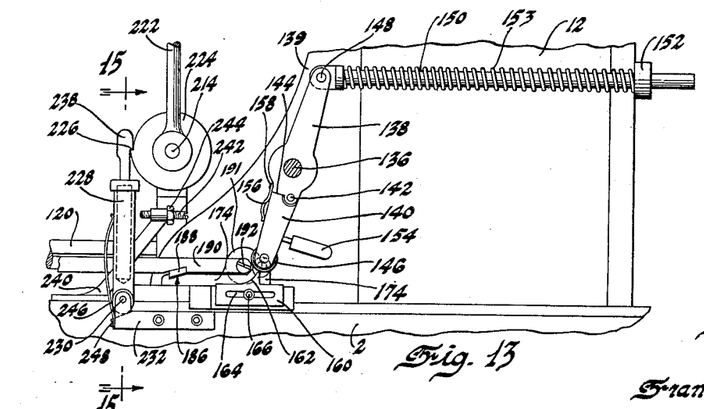
Figure 13 is an enlarged view of the reversing attachment assembly for the drill and the automatic starter for the tap.

To an extension 182 of the drill plate 16, there is secured the angle plate 160 having formed integral with the horizontal web thereof the cam 162 against which the roller 146 is adapted to strike. The plate 160 has the slot 164 in its vertical web to permit of adjustment by means of the retaining bolt 166.

The shaft 136 has rigidly mounted thereon a second arm 168 (Figures 16, 17 and 18) the lower end of which is forked and slotted at 170. In the slots there is received the pin 172 rigidly mounted at the tip of the leg of an L-shaped arm 174 which is adapted to slide in a groove 176 in a block 178 secured to an elongated upwardly extending projection 180 formed on an extension frame 182 and on the foot 21 of the drill plate 16. The extension 182 is united to the drill plate frame by means of the bolts and dowels as shown at 184 in Figure 16. The end of the second leg of the L-shaped arm 174 is provided with a notch 186 in which there is adapted to be received the catch 188, rigidly mounted on an arm or lever 190, pivoted as at 192 to the bracket 191 mounted on the bracket 139 of the gear housing 12. The lever or arm 190 extends rearwardly through a U-shaped bracket 193 mounted on the projection 180 of the extension frame 182. A slidable plunger 194 mounted in the base of the U, is constantly urged against the end of the lever 190 by means of the coil spring 196. A cam 198 is positioned between the lower side of the lever 190 at the bottom of and between the U-shaped bracket and is rigidly mounted on a shaft 200 journalled at one end in the U-shaped bracket and at its opposite end in a bracket 202 mounted on the crosshead 204 which connects the extension frame 182 at the two sides of the machine. (The pistons to operate the two drill plates are attached to the cross-heads.) The shaft 120 has rigidly mounted thereon, a collar 206 which strikes against a finger 208 mounted on the end of the shaft 200. When the shaft 120 has driven the tap 98 to the limit of its infeed, the collar 206 will have moved the finger 208 to cause the cam 198 to raise the end of the lever 190 against the tension of the spring 196 and cause the catch 188 to be lifted from the notch 186 to thereby permit the spring 154 to act on the lever 138 to throw it to the left in Figures 13 and 16, to turn the shaft 136 and reverse the clutch 132, to produce a reverse rotation of the shaft 120 and a withdrawal of the tap from the drilled hole in the end of the crankshaft.

Figures 16, 17, 18, 18A:
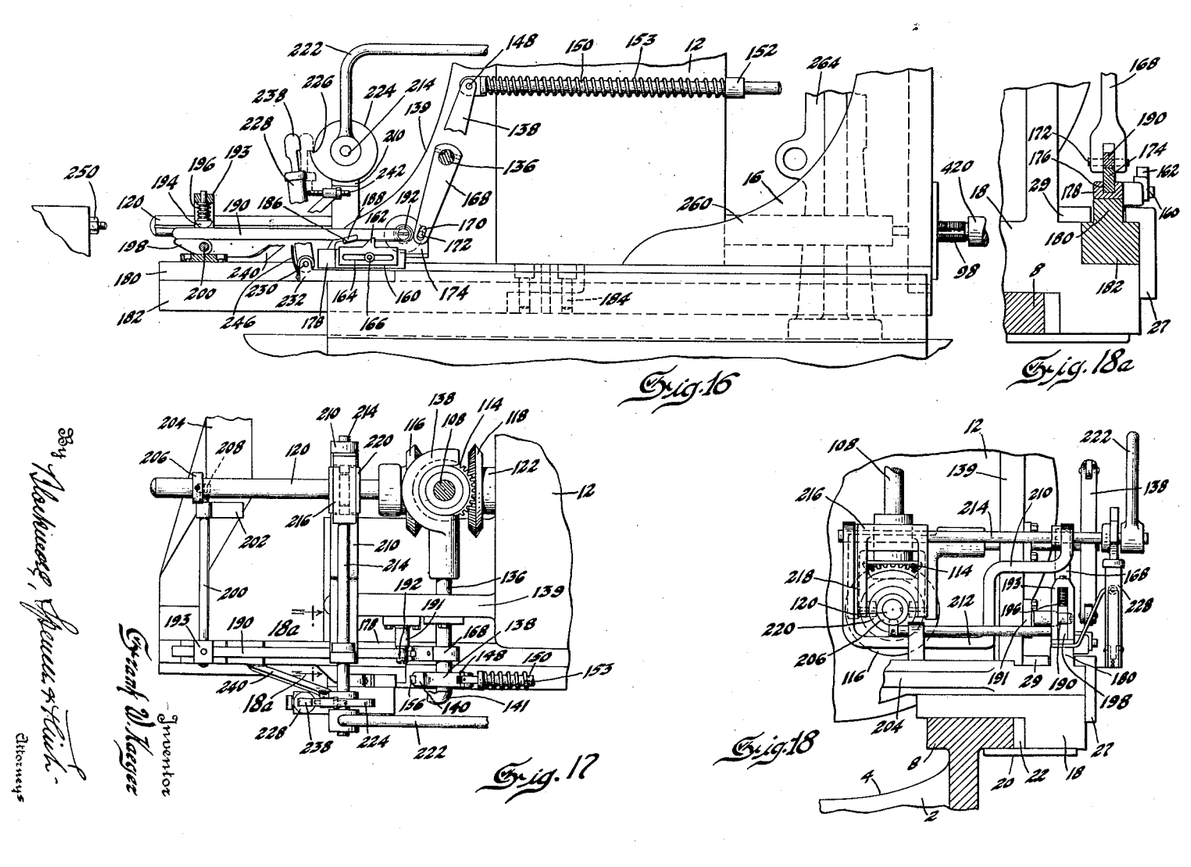
Figure 16 is an enlarged detailed view of the tap starting and reversing mechanism.
Figure 17 is a plan view of the structure of Figure 16, from the left.
Figure 18 is an end view of the structure of Figure 16.
Figure 18a is a section on the line 18a—18a of Figures 16 and 17.

An automatic means to start the tap in the end of the shaft is illustrated in Figures 1, 13, 16, 17 and 18. The mechanism comprises a U-shaped mounting bracket 210 secured to an extension of the gear housing 12 as at 212 (Figure 18). A shaft 214 is journally mounted in the arms of the bracket and has the fork 216 secured to its inner end and straddling the shaft 120. The ends 218 of the fork fit in grooves in a collar 220 secured to the shaft 120. The shaft 214 extends out beyond the machine and has mounted at its end the hand lever 222, the end of which extends toward the center of the machine to permit of the manual operation of the fork 218 and collar 220, if desired. An upward movement of the lever 222 will force the shaft 120 toward the crankshaft and cause the tap 98 to be started in the hole previously drilled in the crankshaft.

The end of the shaft 214 has also mounted thereon the cam 224, having the notch or shoulder 226 formed thereon. A plunger barrel 228 (shown in section in Figure 15) is pivotally mounted as at 230 to a bracket 232 secured to the frame of the head 12. The plunger barrel has mounted therein the plunger 234 and the coil spring 236 is confined between the plunger head and the end of the barrel 228 and always urges the plunger into the barrel. The plunger is formed into a hoop-shaped head 238, the hook of which engages the notch or shoulder 226 on the cam 224.

A bracket 240 is secured to the projecting portion 180 of the extension frame 182 at one side of the plunger barrel 228 and extends upwardly and around to the other side of the plunger, as is best shown in Figures 13 and 16. At its upper end the bracket 240 has mounted therein the setscrew 242 held in position by means of the nut 244. The screw 242 is adapted to contact with the plunger barrel 228 and is so set that it will trip the plunger at a given instant or for a given position of the mechanism. A spring 246 secured at 248 to the bracket 232, presses against the plunger barrel 228 and constantly urges it toward the cam 224 and setscrew 242.

The operation of the structure of Figures 13 and 15 to 18, inclusive, is as follows: With the parts in the position shown in Figure 13, the tap 98 on the shaft 120 is in a position to be started in the drilled hole in the shaft end, the plunger 234 engaging the cam 224 and holding the shaft 214 and forcing the shaft 120 into and toward the work or crankshaft end, the spring 236 absorbing any shock. (Where a manual starting is necessary due to the absence of the plunger, the handle 222 is raised by the operator.) The drill plates 14 and 16 have moved to their full extent against the crankshaft ends to hold the same; the head 12 has moved and is still moving to the right (when referring to Figure 13) and has caused the roller on the hinged end 140 of the arm 138 to ride up on the cam 162 to swing the arm and rotate the shaft 136 to throw the clutch 132 into driving engagement with the gear 116 to cause the rotation of the shaft 120 in a direction to cause the tap to enter the drilled hole in the end of the crankshaft to turn a thread therein. The rotation of the shaft 136 by the cam 162 and the arm 138 will also swing the arm 168 and move the L-shaped lever 174 to the left (Figure 13) and just prior to the arrival of the roller 146 at the peak of the cam 162, the catch 188 on the lever 190 has fallen into engagement with the notch 186 to hold the arm or lever 174 and thereby prevent the spring 154 from throwing the lever 138 in the reverse direction. The roller now rides over the peak of the cam 162 and the spring 156 will give a snap action thereto to cause it to quickly leave the cam, the arm 140 breaking at the hinge 142. The weight 154 will prevent the arm 140 from swinging away from its pivot 142 and tend to hold it in the position shown in Fig. 13 and insure the quick return of the arm 140 over the cam 162 when the head and arm 138 are moving in the opposite direction. As the head 12 continues to move toward the right, it will carry the parts to the full line position shown in Figure 16. The setscrew 242 being on the drill plate frame, is held stationary and the plunger barrel 228 moving with the head 12, will strike against the setscrew and cause the hooked head 238 to be thrown from the notch 226 on the cam 224, this operation occurring immediately after the tap has been started. The tap 98 having been started will now work its own way into the hole, the plunger being then no longer needed. Further movement of the head 12 will cause the collar 206 on the shaft 120 to strike the finger 208 to rotate the shaft 200 which lifts the cam 198. This will raise the lever 190 and remove the catch 188 from the notch 186. The catch 188 will, of course, be removed from the notch 186 only after the tap has been turned inwardly to its full depth. The removal of the catch will release the arm 174 and permit the spring 154 to throw the upper portion of the arm 138 to the left (when referring to Figure 16). This rotates the shaft 136 and causes the clutch 132 to disengage the gear 116 and engage the gear 118 causing a reverse rotation of the shaft 120 and a turning of the tap 98 out of the tapped hole in the crankshaft. The shaft 120 will now move rearwardly while the housing is still moving forward toward the work to allow the remainder of the tools to complete their work. The tap 98 will be withdrawn completely from its tapped hole before the other tools have performed their operations. The rearward movement of the shaft 120 in reverse while the head 12 is still moving forward, will rotate the shaft 214 and its cam 224 in a clockwise direction through the intermediary of the collar 220 and fork 216. As soon as the tap is out of its hole the weight of the handle 222 will move the shaft 120 to its rearmost position.

When all the tools have completed their operations and the head 12 and the drill plate 16 and its frame 182 are moving away from the work, the head 12 will commence its movement a little prior to the drill plate and will carry therewith the shaft 120. The drill plate, however, moves faster and will have reached the rearward limit of its movement before the gear housing returns to its rearwardmost position. The end of the shaft 120 has struck against a setscrew 250 mounted on a stationary part of the machine. This prevents further rearward movement of the shaft but the head 12 and the bracket 210 secured thereto will continue their rearward movement. The collar 220 on the shaft 120 will be held stationary when the shaft 120 strikes the setscrew 250 which will cause the fork 218 to swing and rotate the shaft 214 counter-clockwise in the bracket 210. This will rotate the cam 224 on the shaft 214 in a counter-clockwise direction (when referring to Figure 16) and cause the cam shoulder 226 to slip beneath the hooked head 238 of the plunger 228. The engagement of the shoulder 226 with the hook 238 will hold the shaft 120 in a position so that the tap 98 will be forced into the drilled hole in the end of the crankshaft against the action of the plunger spring 236 when the head 12 is again moved toward the work. The spring 236 in the plunger barrel 228 will absorb the shock when starting the tap and prevent too rapid engagement of the tap in the hole.

Separate oil cylinders and pistons (not shown) are used to operate the master drill plates 14 and 16 to move them from and to the work in cooperative relation relative to the gear housings 10 and 12. One of the master drill plates is shown in detail in Figure 14. As the drill plates are substantially duplicates of each other, the description of the one will suffice for both. The plate has the flat face 252 which faces the work. The face 252 is provided with the openings 254 in each of which there is received a floating ring 256 (Figures 20 to 24, inclusive). The openings are for the purpose of allowing the tools of the gear housings 12 and 14 to project toward the work and each opening corresponds to the position of the crankshaft on the rotatable crankshaft carrying spool 258. The sides of the drill plates are provided with the bracket portions or extensions 260 to strengthen and support the same and serve as a means for properly mounting the plates on the lathe bed. Each drill plate bracket 260 has the extension frame 182 secured thereto as at 184 and interconnected at its end by the cross-head 204.

The crankshaft carrying holder or spool is journalled in uprights 262 and 264 mounted on the bed plate between the housings 10 and 12 and the drill plates 14 and 16. The spool or carrier is provided with an indexing mechanism and a means to rotate it in conformity with the movements of the drill plates and gear heads as will now be described.

The uprights 264 is of special construction as is best shown in the side view of Figure 3. It is forked at its lower end as indicated at 266 and between the forks a notched wheel 261 is rigidly mounted on the shaft 263. The shaft 263 is journalled in the uprights 262 and 264 and has the spool 258 rigidly secured thereto. The upright 264 has the U-shaped extension bracket 265 having the arms 267 and 269 in which there is slidably mounted the plunger 268. A coil spring 270 surrounds the plunger and is held between the arm 269 and a collar 272 rigidly mounted on the plunger. The spring always urges the plunger inwardly to cause the tooth 274 on its end to engage in one of the notches 276 on the notched wheel 261. The plunger end 278 extends to the rear of the machine and has rigidly mounted thereon the collar 280 having an arm or fork 282 fitting in a groove on a collar 284 formed on one half 286 of a clutch 288, splined on a shaft 289. The extremity of the plunger end 268 has the cylindrical block 290 secured thereon by means of the machine screw 292.

A bracket 294 is secured to the rear of the machine bed and supports a driving shaft 296 driven in any suitable way. A bevel gear 298 on the driving shaft meshes with a bevel gear 300 rigidly mounted on a sleeve 302 freely rotatable on the shaft 289. The sleeve 302 is mounted in a second bracket 306 secured to the bed of the machine as at 308. Rigidly mounted relative to the sleeve 302 is the second half 310 of the clutch 288. The gears 296 and 300 are always in mesh and constantly drive the collar 302 but will not drive the shaft 289 unless the clutch 288 is in engagement. The shaft 289 extends inwardly to, and is journalled in, the upright 264 and has the worm 312 secured thereto. The worm meshes with the worm wheel 314 rigidly mounted on the shaft 268 of the spool 258.

Figures 5, 6, 7:
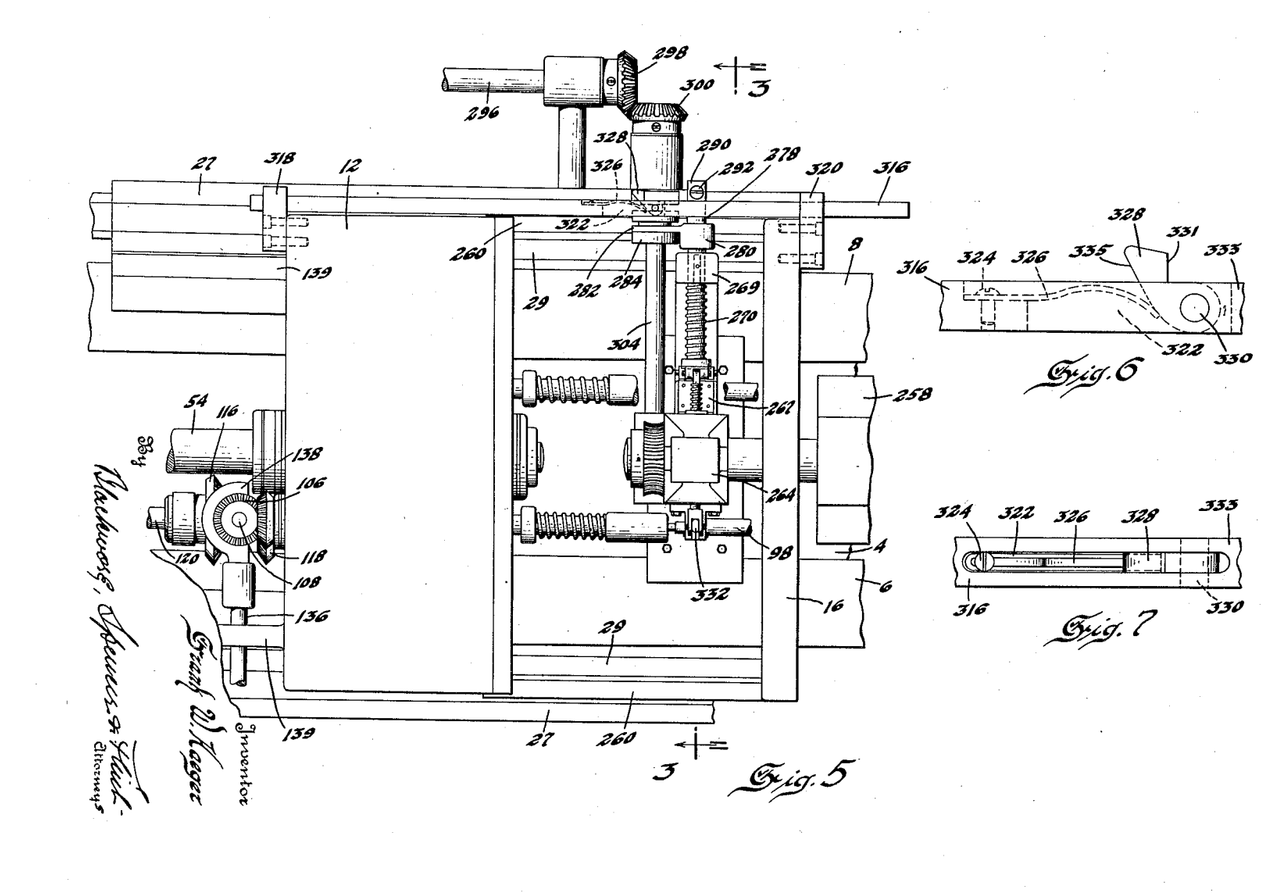
Figure 5 is a plan view of the indexing mechanism of Figure 3.
Figures 6 and 7 are enlarged detail views of a portion of the index release mechanism for the rotatable spool.

Referring to Figure 5, it will be seen that a bar 316 is mounted so as to reciprocate over the upper portion of the plunger end 278, closely adjacent the block 290. The bar is rigidly mounted as at 318 to the gear housing 12 and is slidable at 320 in a bracket secured on the master drill plate 16. As is best shown in Figures 6 and 7, the bar 316 has a recessed portion 322 intermediate its ends. In the recessed portion at one end thereof, there is secured as at 324 a curved spring 326 which presses against a dog or trigger 328 pivoted as at 330 at the opposite end of the recess 322. The trigger may be depressed into the recess 322 against the tension of the spring 326 when the rod is moved to the right or toward the top of the sheet when referring to Figure 5, but in the reverse direction the shoulder 331 of the trigger strikes against the side of the bar 316 at 333 and causes the cam portion 335 of the trigger to force the block 290 to the left (Figure 5) and pull the plunger 268 away from the notched wheel 261. The shifting of the plunger will move the fork 282 to the left (Figure 5) to cause the engagement of the clutch 288 and produce the rotation of the shaft 304. The parts are so arranged that the clutch 288 will not be engaged until the tooth 274 has been withdrawn from its recess in the notched wheel 261. When the wheel 261 has turned the distance between its adjacent notches, the trigger 328 will have passed and become disengaged from the block 290 to permit the spring 270 to force the plunger 268 inwardly to engage the tooth 274 in the next notch 276. The movement of the plunger 268 will shift the fork 282 to throw out the clutch 288. The above-described operation will produce a movement of the crank-shaft holding carrier or spool 258 through an arc sufficient to cause the shafts mounted thereon to conform to the tools to perform the suceeding operations on the shafts.

It is sometimes desirable to manually shift the plunger 268 in order to rotate the crank holding spool 258 to a desired position. Accordingly, a lever 332 (Figures 1 and 3) is pivoted as at 334 to a bracket 336 secured to the upright 264. A rod 338 is pivoted at 340 to the lever 332 and extends through the recess 266 in the upright 264 to the opposite side of the upright where it is pivoted as at 341 to a lever 342 pivoted at 344 to a bracket 346 mounted on the arm 267 of the bracket 264. The lower end of the lever 342 abuts against the collar 272 on the shaft 268. A coil spring 348 is confined between the pivot 341 and the upright 264 and constantly urges the parts to the position shown in Figure 3. It will be apparent that by pulling the lever 332 to the left (when referring to Figure 3) the rod 338 will swing the lever 342 on its pivot 344 to push the collar 272 and its shaft 268 to the right to withdraw the tooth 274 from the notch 276 in the notched wheel 260. This operation will at the same time throw in the clutch 288 to cause the rotation of the shaft 304, the worm 312, and worm wheel 314, to rotate the shaft 268 and the crank-shaft holding spool 258.

Figures 19, 20, 21, 22, 23:
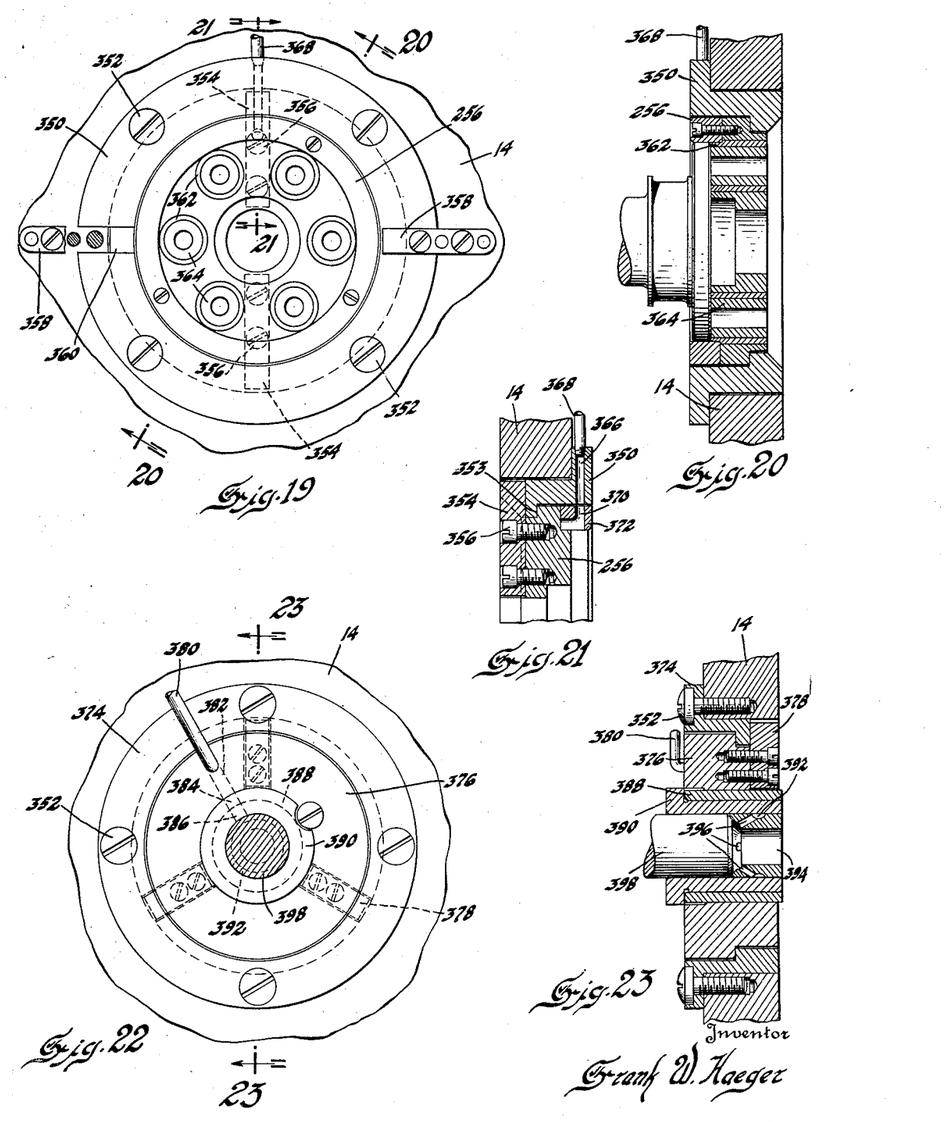
Figure 19 is an enlarged detailed view of the master drill plate at the drills for the flange holes.
Figure 20 is a section on the line 20—20 of Figure 19.
Figure 21 is a section on the line 21—21 of Figure 19 showing the pipe for supplying the compound.
Figure 22 is a detailed view of the drill plate for the tools other than the flange hole tap and drill.
Figure 23 is a section on the line 23—23 of Figure 22.

Referring to Figures 19, 20 and 21, there is shown the portion of the master drill plate 14 at the places where the tools for reaming and drilling the flange holes are positioned. Each structure comprises the master drill plate adapter 350 mounted on the drill plate 14 by means of the machine screws 352, the shanks of which pass through over-sized openings in the adapter to permit of relative movement between the adapter and drill plate. Positioned in and concentric with the adapter 350 is the floating or drill plate ring 256 which is appreciably smaller than the opening in the adapter 350. The ring 256 is secured to the adapter 350 by means of the shoulder 353 and the keys 354 which are slidably mounted in slots in the adapter 350 and which are secured to the ring by means of the machine screws 356. The keys 354 permit of the movement of the ring 256 relative to the adapter plate 350 in one direction. Two such keys 354 are provided at diametrically opposite points. A second set of diametrically positioned keys 358 at right angles to the first set 354 is secured to the drill plate 14 and fits in grooves 360 in the adapter 350. The keys 358 permit of a relative movement between the drill plate 14 and the adapter 350. The keys 358 accordingly permit of the movement of the adapter and the floating ring in a horizontal plane or from right to left in Figure 19. The keys 354 permit of the movement of the ring 256 relative to the adapter 350 in a vertical plane or lengthwise of the sheet when considering Figure 19. The purpose of these two adjustments is to allow for small inaccuracies of position and to permit the adapter and ring to accommodate themselves to the drills and to the flange end of the crank-shaft.

The ring 256 has mounted therein the liners 362 and the bushings 364, one liner and one bushing for each drill hole, as shown in Figure 19.

The adapter 350 is provided with an opening 366 to which there is connected the small tube or pipe 368 which conducts the lubricant or coolant to the drills. The pipe is sufficiently flexible to allow for the relative movement of the drill plate 14 and the adapter 350. A passage 370 in a ring 372 connects with the passage 366 to allow the compound to flow to the work.

The structure shown in Figures 19 to 21, inclusive, is used only for the tools which ream and drill the flange holes, six of which are usually provided. For the other operations where but a single tool is used, the structure shown in Figures 22 and 23 is used. In this figure the adapter 374 is rigidly mounted on the drill plates 14 or 16 by means of the machine screws 352. The floating ring 376 is positioned in an oversized opening in the adapter 374 and is provided with three keys 378 positioned substantially 120° apart in slots in the adapter 376. The slots have proper clearances to allow the ring 376 to float freely within limits in the adapter 256. The purpose of the floating ring 376 is the same as that of the structure of Figures 19, 20 and 21.

A pipe 380 conducts the grinding compound or coolant to a passage 382 in the ring 276. The passage 382 conforms to passages 384 and 386 in a liner 388 and a bushing 390, respectively. The grinding compound is delivered to a groove 392 in a guide bushing 394. The guide bushing 394 has four openings 396 which conduct the compound directly to the tool, a holder of which is shown at 398.

Figure 24:
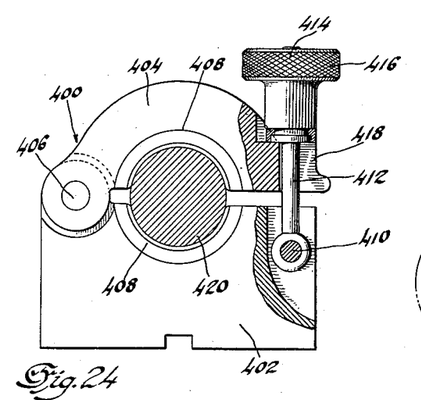
Figure 24 is an enlarged detailed view partially in section of the crank holding fixture showing the means for holding the crank shafts on the holder or spool.

Figures 24 to 27, inclusive, show the devices for holding the crankshaft on the spool 258. Two of the fixtures 400 of Figure 24 are used for each crankshaft, one fixture being positioned at each end of one of the hexagonal faces of the spool. The fixture 400 comprises the lower block portion 402, which is rigidly and permanently secured to the spool, and the upper portion 404 hinged as at 406 to the lower portion. The two parts 402 and 404 have conformable semi-circular recesses receiving the bushings 408 which conform in shape to the end bearings of the crankshaft. At the front of part 402, a bolt 412 is pivoted on the rod 410. The upper end of the bolt is threaded to receive the nut member 414 having the knurled head or handle 416. The shank of the bolt 412 fits into a fork 418 formed in the end of the upper hinged portion 404. The position of the parts shown in Figure 24 is in the clamping position and holds the crankshaft 420 rigidly on the spool 258. By unscrewing the handle 416, the bolt 412 may be swung away from the fork 418 to permit the upper portion 404 to swing on its hinge 406 and allow the removal of the crankshaft 420.

Figure 25:
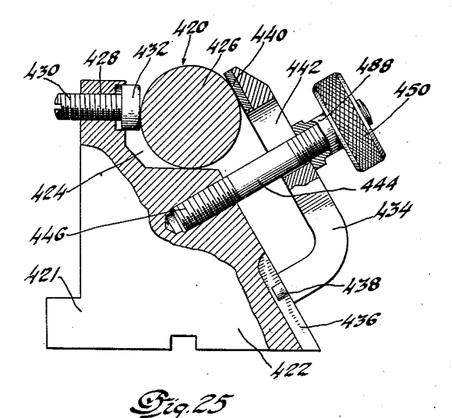
Figure 25 is an enlarged detailed view showing the clamping device or the means for positioning the crank pin bearings of the crankshaft on the spool or holder.

The crank throw clamping device 421 (one of which is used for each shaft) is shown in Figure 25 and comprises the base or block portion 422 which is rigidly secured to one of the hexagonal faces of the crankshaft spool. The upper portion of the block 422 has the notched-out portion 424 adapted to receive the bearing portion 426 of one of the throws of the crankshaft. A threaded opening 428 is provided on the block 422 at the recess 424 and a setscrew 430 is received in the opening. The head 432 of the screw serves to locate the throw of the crankshaft 420 in a definite position. A clamp 434 is positioned at the front of the block 422. The block has the recess 436 at its lower portion in which there is received the reduced end 438 of the clamp 434. The upper end of the clamp has the copper striking plate 440 secured thereto, which plate is adapted to hold the throw bearing when the crankshaft is in position. The clamp has the slot 442 intermediate its ends in which there is received the shank of a bolt 444. The inner end of the bolt is threaded into the block 422 as shown at 446, while on the outer end there is threaded the nut 488 having the knurled head or handle 450. By unscrewing the handle 450 (from the position of the parts shown in Figure 25) the clamp 434 will be released and permit a removal of the crankshaft 420.

Figure 26:
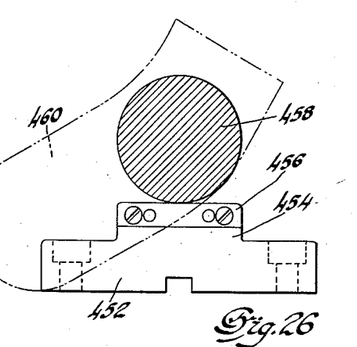
Figures 26 and 27 are enlarged detailed views of the locating pad showing the means for taking the thrust of the crankshaft on the spool or holder.
Figure 27:
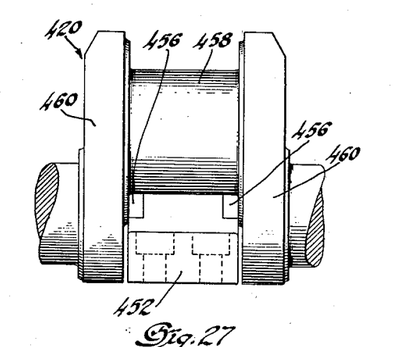

A locating pad or thrust block 452 is shown in Figures 26 and 27. The pads 452 are secured to the hexagonal face of the spool, preferably at their mid portions, but one pad is used for each crankshaft. The pad comprises the upwardly projecting portion 454 which has secured at each side the hardened locating blocks 456. The pad 452 receives one of the main bearings 458 on the top thereof and two of the throws 460 at either side. Each of the throws is adapted to strike and closely fit against one of the locating blocks which take the thrust of the crankshaft in both directions when the tools are working on the ends thereof.

Referring to Figures 9 and 28, there is shown a means for adjusting the position of the reaming tool 80, but may be applied to the other tools as well. The shaft 82 has the rod 462 concentrically mounted therein and extending outwardly beyond the rear of the housing 10, as shown at 464. The end of the rod adjacent the tool 80 is screwthreaded as shown at 466 and is received in the internally threaded portion of a sleeve 468 in the head 469 of which the reaming tool 80 is mounted. A dial 470 shown in enlarged detail in Figure 28 is rigidly attached to the end 464 of the rod 462. The dial 470 has the graduations 472 at its periphery and by turning it through a suitable arc in either direction, the tool 80 may be moved either inward or outward, the adjustment being accomplished by the turning of the screwthreaded portion 466 in the sleeve 468. A suitable index mark 473 is provided on the plate 475 rigid with the head 10.

Figure 11:
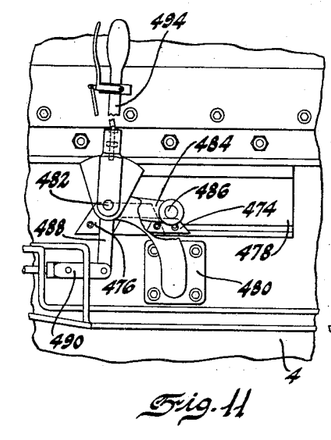
Figures 11 and 12 are detailed views of the cams for operating the oil gear mechanism.
Figure 12:
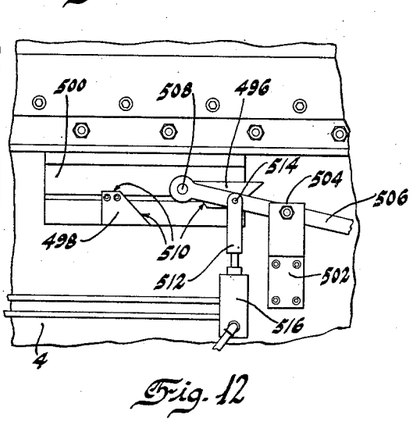

In Figures 11 and 12, there are shown enlarged detailed views of the cams for controlling the flow of oil to operate pistons for the housings and drill plate. Referring to Figure 11, it will be seen that the cam comprises the two cam members 474 and 476 rigidly mounted on a plate 478, permanently mounted relative to the housing 12 and adapted to move therewith. A bracket 480 is rigidly attached to the bed 4 of the machine and supports a shaft 482 on which there is rigidly mounted an arm 484 having a roller 486 on its end. The roller 486 is adapted to contact with and ride over the cam surface. The shaft 482 has also rigidly mounted thereon an arm 488 which is connected by means of a link 490 with a five-way valve 492 (Figure 1). A handle 494 is secured to the shaft 482 to permit of manual operation.

In Figure 12 the cams comprise the two cam members 496 and 498 permanently mounted on a plate 500 rigidly mounted relative to and adapted to move with the housing 10. A bracket 502 mounted on the bed 4 has pivotally mounted thereon as at 504 a lever 506 on the end of which is mounted a roller 508 adapted to move over the cam surface 510 of the cams 496 and 498. A link 512, pivoted to the arm 506 at 514, is connected to a valve in a housing 516 (Figures 1 and 12). The sole purpose of the cam mechanism in Figure 12 is to operate the valve 516 to cause a reverse and rapid flow of oil to the cylinders to cause a rapid movement of the drill plate and gear housings away from the work. On the return movement (or away from the work) there is no reason for a slow movement as is the case when the gear housing is advancing the tools into the shafts. Accordingly, when the tools have completed their operation on the shaft and have been withdrawn it is desirable to move the gear housings and drill plates rearwardly at a much more rapid rate. In the position of the parts shown in Figure 12, the gear housing has almost advanced to the full limit of its forward movement. A further movement will cause the cam 496 to move the roller 508 downward to cause the lever 506 to operate the valve 516 to reverse the flow of oil and increase its quantity. As the housing then moves in the opposite direction, the roller 508 will maintain its position until it strikes the cam surface on the cam 498. This will throw the roller 508 upward and cause a reversed and decreased flow of oil from the cylinders to cause a slower movement of the gear housings and drill plates.

In Figure 11, the purpose of the two cams 474 and 476 is to permit of a rapid movement of the gear housing while the tools are advancing to the work, but when the tools have once arrived at the work, a much slower movement is desired to permit the tools to properly act on the shaft ends. Accordingly, when the roller 486 is travelling over the surface of the cam 474 as shown in the position of the parts in Figure 11, the movement of the gear housing will be toward the work and will be relatively rapid because a larger flow of oil is allowed to the cylinders. The tools reach the work when the roller 486 strikes the inclined surfaces of the cam 476. The lever or arm 484 will now be moved upward to rotate the shaft 482 and move the arm 488 and link 490 to operate on the valve 492 to decrease the flow of oil. This will permit of a slower movement during the period that the tools are operating or during the period the roller 486 rides over the upper horizontal surface of the cam 476. When the housings have advanced to their innermost position and the tools have finished their operations, the mechanism of Figure 12 will come into operation to reverse the flow of oil. The pressure of the oil on a piston located in a cylinder 518 (Figure 1) will throw the link 490 to the left (when referring to Figures 1 and 11) to return the roller 486 to its initial position.

The structure of Figures 11 and 12 is no part of the invention but forms a portion of the oil gear installation for operating the drilling machine.

By referring to Figure 14, it will be noted that there are six openings 254 in the drill plates 14 and 16 while but a maximum of five tools is on either head. This will allow for an opening in both drill plates where there is no corresponding tool on the heads 10 and 12. This opening is left free of the structure of Figures 19–23 and is at the front of the machine and permits the operator to remove a finished crankshaft and replace it with an unfinished one while the tools are working on the crankshafts mounted on the carrier.

Only two of the tools (Figure 9) are shown for the head 10, but five are used to perform the indicated operations. These tools are of the conventional kind and are mounted on shafts 510 journally mounted in the housing and driven from the gears 78. Similarly in the head 12 three tools are used, one of which (the tap 98) is shown in Figure 10. Two other tools are used (one of which is shown at 512 in Figure 1) and operated from shafts mounted in the housing and driven from the gears 92 and 94.

I claim:

1. In a crankshaft drilling machine comprising, means for mounting a plurality of crankshafts, means for rotating said mounting means, a plurality of heads, means for reciprocating said heads relative to said crankshafts, a plurality of tools operated from each head and adapted to act on the ends of said crankshafts, a plurality of reciprocable drill plates for holding said shafts and guiding said tools when acting on said shafts, means for reciprocating said drill plates, and means for causing the operation of said rotating means coincident with the movement of said heads.

2. In a crankshaft drilling machine for simultaneously operating on a plurality of crankshafts mounted on a rotatable spool, a drill plate movable from and to the crankshaft, a plurality of floating rings in said plate, one ring for each crankshaft end, a passage in each ring, and means for conducting a coolant to said passage during the operation of the tools of the drilling machine on the crankshaft ends.

3. In a crankshaft drilling machine for simultaneously operating on the ends of a plurality of crankshafts, reciprocable housings having a plurality of tools each performing a different operation on said ends, one of said tools being a tap, means to reciprocate said housings, a driven slidable shaft mounted in one of said housings for rotating said tap, a pair of driven gears freely rotatable on to said shaft, a clutch splined to said shaft between said gears and adapted to be shifted to engage either of them to drive said shaft in either direction, means operative on the movement of said housings toward said crankshafts for throwing said clutch into engagement with one of said gears to drive said shaft to turn said tap into the crankshaft end, means operative on further movement of said housings to throw said clutch out of engagement and into engagement with the other of said gears to reverse said shaft and withdraw said tap, and means for causing the operation of said rotating means after the tap has been withdrawn.

4. In a crankshaft drilling machine comprising, means for mounting a plurality of crankshafts, means for rotating said mounting means, a plurality of reciprocable heads, means for reciprocating said heads toward and away from said crankshafts, a plurality of tools in each head for operating on said crankshafts, one of said tools being a tap secured to a shaft slidably mounted in bearings in one of said housings, a plurality of reciprocable drill plates mounted on said machine and adapted to engage the crankshaft ends and guide said tools during the operation thereof, means to reciprocate said drill plates, a pair of gears loosely mounted on said shaft, means to drive said gears, a clutch member splined to said shaft between said gears and adapted to engage either to drive said shaft in either direction, means on said housing to start said tap, means on said drill plate to throw off said starting means after the tap has been started, means to throw said clutch into engagement with one of said gears to drive said shaft in a direction to turn said tap into said shaft, and means to throw said clutch out of engagement and into engagement with the other gear to turn said tap out of its threaded hole, and means for causing the operation of said rotating means after the tap has been withdrawn.

5. In a crankshaft drilling machine, a spool for mounting a plurality of crankshafts, means for journally mounting said spool, a plurality of movable heads on said machine, tools driven from said heads and adapted to operate on the crankshaft ends, a notched wheel rigidly mounted relative to said spool, gearing including a shaft for rotating said spool, a clutch on said shaft, a slidably mounted plunger for engaging the notches of said notched wheel, means on said plunger engaging said clutch, and means operated by the movement of said heads to withdraw said plunger and throw in said clutch to cause said gearing to rotate said spool.

6. In a crankshaft drilling machine, a spool for mounting a plurality of crankshafts, means for journally mounting said spool, a pluraity of movable heads on said machine, tools driven from said heads and adapted to operate on the crankshaft ends, a notched wheel rigidly mounted relative to said spool, gearing including a shaft for rotating said spool, a clutch on said shaft, a slidably mounted plunger for engaging the notches of said notched wheel, means on said plunger engaging said clutch, and manually operable means for withdrawing the plunger and throwing in the clutch to cause said gearing to rotate said spool.

7. In a crankshaft drilling machine, a spool for mounting a plurality of crankshafts, means for journally mounting said spool, a plurality of movable heads on said machine, tools driven from said heads and adapted to operate on the crankshaft ends, a notched wheel rigidly mounted relative to said spool, gearing including a shaft for rotating said spool, a clutch on said shaft, a slidably mounted plunger for engaging the notches of said notched wheel, means on said plunger engaging said clutch, a bar rigidly secured to one of said housings, a trigger attached to said bar and operatively engaging said plunger to withdraw the same and throw in said clutch to cause said gearing to rotate said spool.

8. In a crankshaft drilling machine, a rotatable crankshaft holder or carrier, means for rigidly and removably mounting a plurality of crankshafts on said carrier, means for journally mounting said carrier, a plurality of heads slidably mounted on said machine, tools carried by said heads and driven therefrom and adapted to work on the crankshaft ends, a plurality of drill plates slidably mounted on said heads, said drill plates adapted to engage the crankshaft ends and to guide the tools relative to the said ends, independent means for reciprocating said heads and drill plates, said tools and drill plates permitting the removal of one crankshaft from and the placement of another on said carrier while said tools are operating, and means for rotating said carrier through a given arc to present said crankshafts to a different tool.

9. In a crankshaft drilling machine, a crankshaft carrier rotatably mounted on said machine, means for removably mounting a plurality of crankshafts on said carrier, a pair of heads slidably mounted on the machine and reciprocable from and to the ends of said crankshafts, a plurality of tools mounted on each head and operated therefrom for working on said crankshafts, a pair of drill plates slidably mounted on said housings and adapted to engage the crankshaft ends and guide the tools while the tools are operating, independent means for reciprocating said heads and plates, means for rotating said carrier, means for positively holding said carrier in a plurality of definite positions, and means incident to the movement of said housings for disengaging said holding means and causing the operation of said rotating means to move said carrier to its next succeeding position.

10. In a crankshaft drilling machine, a drill plate to position the crankshaft ends and guide the tools of the machine, a floating ring in said plate at each crankshaft end, and means to conduct a coolant through the ring to the work.

11. In a crankshaft drilling machine, a drill plate to position the crankshaft ends and guide the tools of the machine, a floating adapter mounted in said plate at the crankshaft ends, and a floating ring mounted in said adapter.

12. In a crankshaft drilling machine, a drill plate to position the crankshaft ends and guide the tools of the machine, a floating adapter mounted in said plate at each crankshaft end and adapted to move in a plane relative to said plate, and a floating ring mounted in said adapter to move at substantially right angles to said adapter.

13. In a crankshaft drilling machine, a drill plate to position the crankshaft ends and guide the tools of the machine, a floating adapter mounted in said plate at each crankshaft end, and a floating ring mounted in each adapter, and means in said adapters and rings to conduct a coolant therethrough to the work.

14. In a crankshaft drilling machine, a carrier for removably holding a plurality of crankshafts, a plurality of heads reciprocable relative to said carrier, a plurality of tools on said heads to work on both ends of said shafts, means to reciprocate said heads, and means attached to the head and operative upon the completion of the work performed by the tools to cause said reciprocating means to reverse the direction of movement of the heads to withdraw the tools from the work, said last-named means also causing the reciprocating means to reverse the direction of movement of the heads after the tools have been withdrawn from the work to again move the heads and tools toward the crankshaft.

15. In a crankshaft drilling machine having a bed, a carrier for removably holding a plurality of crankshafts, a plurality of heads slidably mounted on said bed, means to reciprocate said heads, a drill plate slidably mounted on each head, means to reciprocate said plates, said plates and heads moving out of unison, and a plurality of tools on said heads adapted to work on the crankshafts, said plates guiding said tools and positioning said shafts.

16. In a crankshaft drilling machine having a bed, a carrier for removably holding a plurality of crankshafts, a plurality of heads slidably mounted on said bed, means to reciprocate said heads, a plurality of tools on said heads adapted to work on said shafts, said tools including a tap, means to turn said tap into the end of a shaft to turn a thread, means to withdraw the tap from the threaded end before the remainder of the tools have finished their work, and means to reverse the movement of the heads to withdraw them away from the crankshafts when the tools have completed their work.

17. In a crankshaft drilling machine, a carrier for removably holding a plurality of crankshafts, a head slidably mounted on the machine at each end of the carrier, means to reciprocate said heads to and from the carrier, a plurality of tools on the head for operating on the crankshaft ends, a drill plate slidably mounted on each head, said plates adapted to guide the tools and position the crankshaft ends relative to the tools, means to reciprocate said plates, and cooperative means rigidly mounted relative to the head to cause the reversal of the reciprocating means of both the drill plates and the heads when the tools have finished their work, said means also operative to reverse the reciprocating means when the heads and drill plates are at the limits of their movements away from the carrier.

18. In a crankshaft drilling machine, a carrier for removably holding a plurality of crankshafts, a head slidably mounted at each end of the carrier, means for reciprocating said heads, a plurality of tools mounted on and operable from each head to work on the ends of the crankshafts, one of said tools being a tap to make a thread in the end of the crankshaft, a slidable drill plate for each head, said drill plates positioning the crankshaft ends and guiding the tools, means to reciprocate said drill plates, and cooperating means on a drill plate and on a head to reverse the rotation of the tap to withdraw it from its tapped hole.

In testimony whereof I affix my signature.

FRANK W. HAEGER.